(12) United States Patent
Torres et al.

(10) Patent No.: US 9,531,736 B1
(45) Date of Patent: Dec. 27, 2016

(54) DETECTING MALICIOUS HTTP REDIRECTIONS USING USER BROWSING ACTIVITY TREES

(71) Applicant: Narus, Inc., Sunnyvale, CA (US)

(72) Inventors: Ruben Torres, Sunnyvale, CA (US); Hesham Mekky, Falcon Heights, MN (US); Zhi-Li Zhang, Eden Prairie, MN (US); Sabyasachi Saha, Sunnyvale, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 71 days.

(21) Appl. No.: 13/726,475

(22) Filed: Dec. 24, 2012

(51) Int. Cl.
*G06F 21/50* (2013.01)
*H04L 29/06* (2006.01)

(52) U.S. Cl.
CPC .......... *H04L 63/1408* (2013.01); *G06F 21/50* (2013.01); *H04L 63/14* (2013.01)

(58) Field of Classification Search
CPC ............. H04L 63/1458; H04L 63/1416; H04L 63/1441; H04L 63/1425; H04L 63/145; H04L 63/1483; G06F 21/566
See application file for complete search history.

(56) References Cited

U.S. PATENT DOCUMENTS

| | | | |
|---|---|---|---|
| 2005/0022031 A1* | 1/2005 | Goodman et al. ............ | 713/201 |
| 2007/0208822 A1* | 9/2007 | Wang et al. .................. | 709/217 |

* cited by examiner

*Primary Examiner* — Tri Tran
(74) *Attorney, Agent, or Firm* — Kwan & Olynick LLP

(57) ABSTRACT

A method for detecting malicious HTTP redirections. The method includes obtaining, based on a single client IP address, HTTP flows triggered by visiting a website, extracting a sequence of URLs where a downstream URL is extracted from a child HTTP request that is triggered by a parent HTTP request containing an immediate upstream URL, analyzing the URL sequence to generate a statistical feature, and classifying, based on the statistical feature, the HTTP flows as containing at least one malicious HTTP redirection triggered by visiting the website.

20 Claims, 6 Drawing Sheets

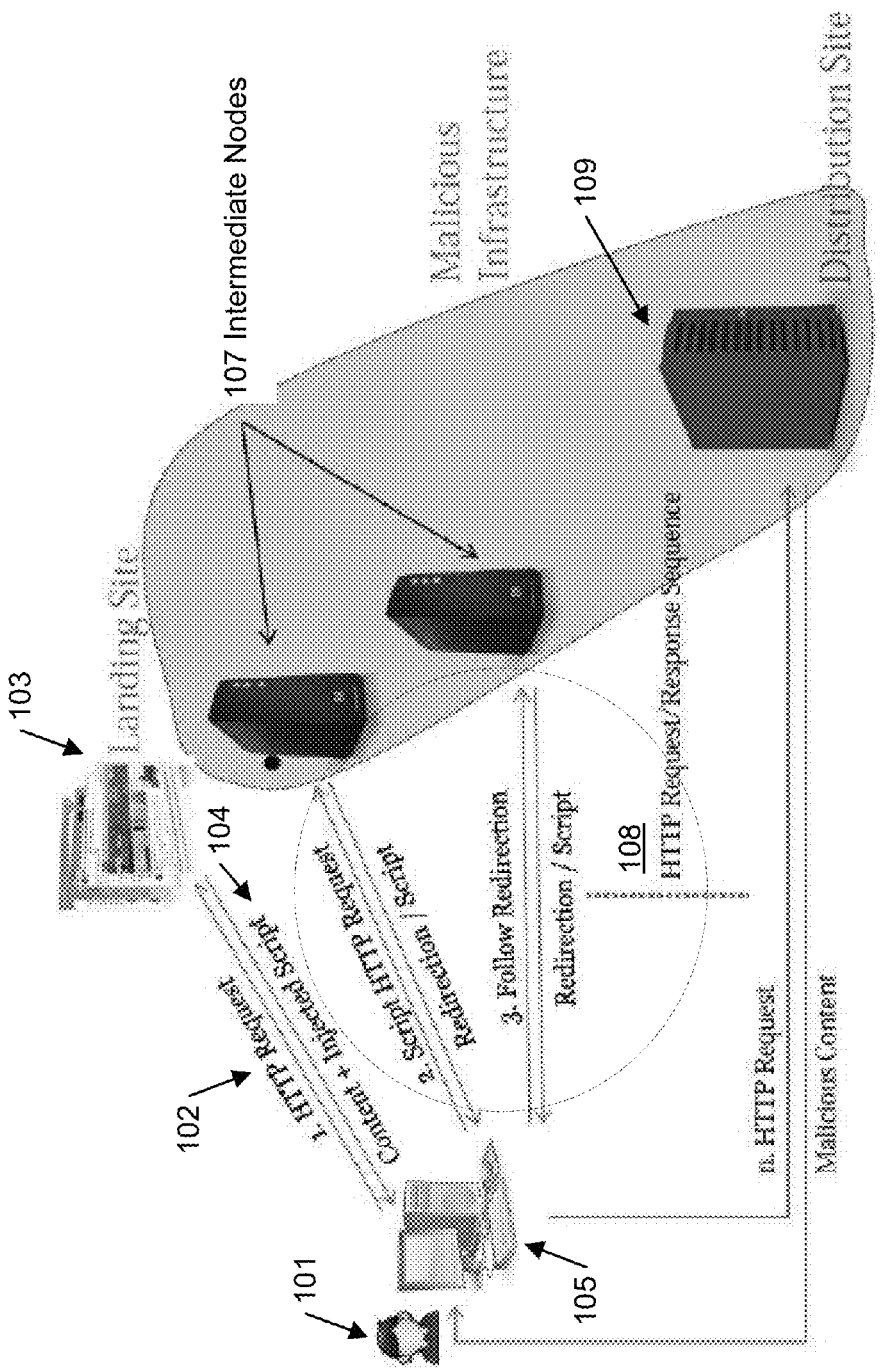
FIG. 3.1

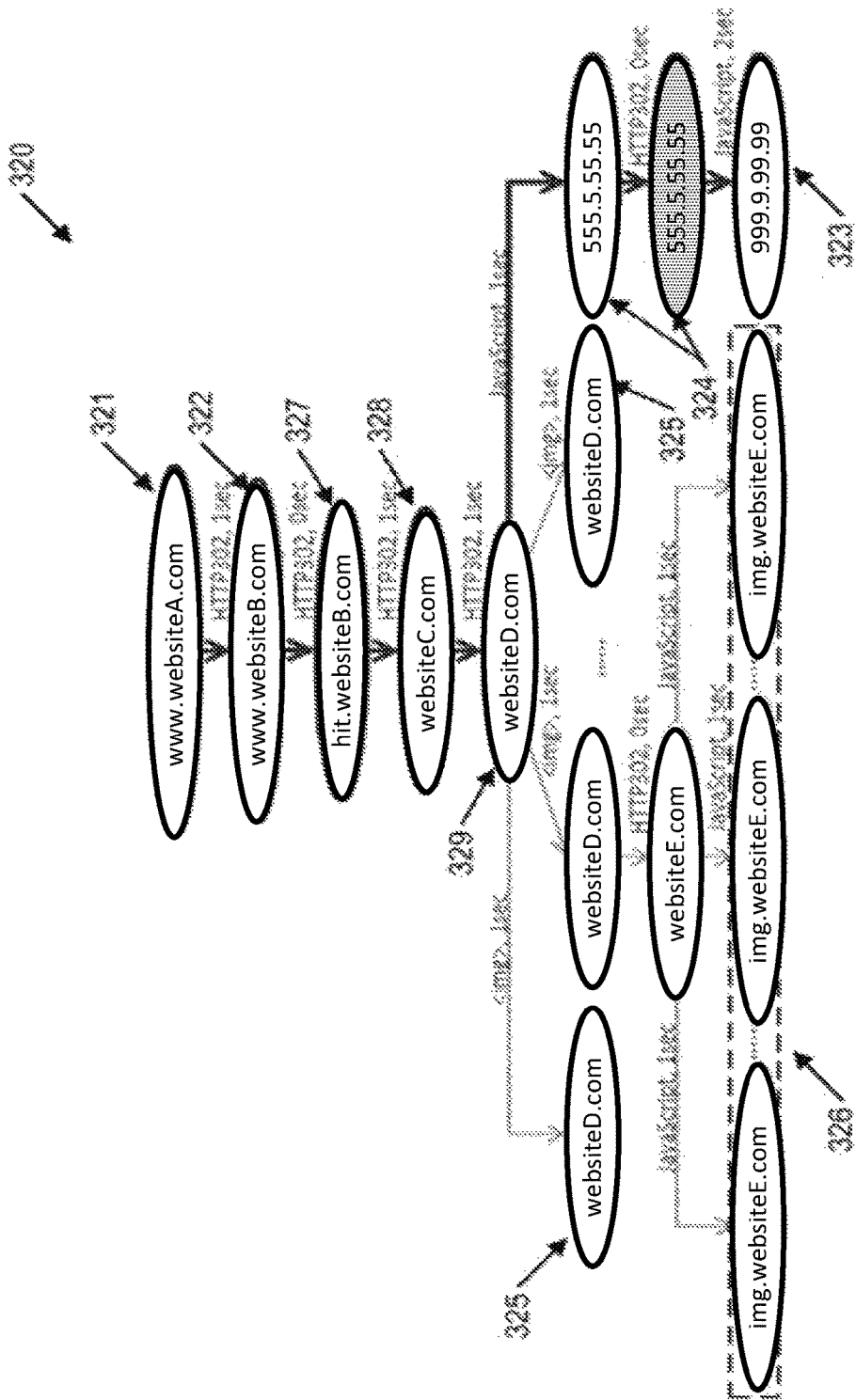
FIG. 3.2

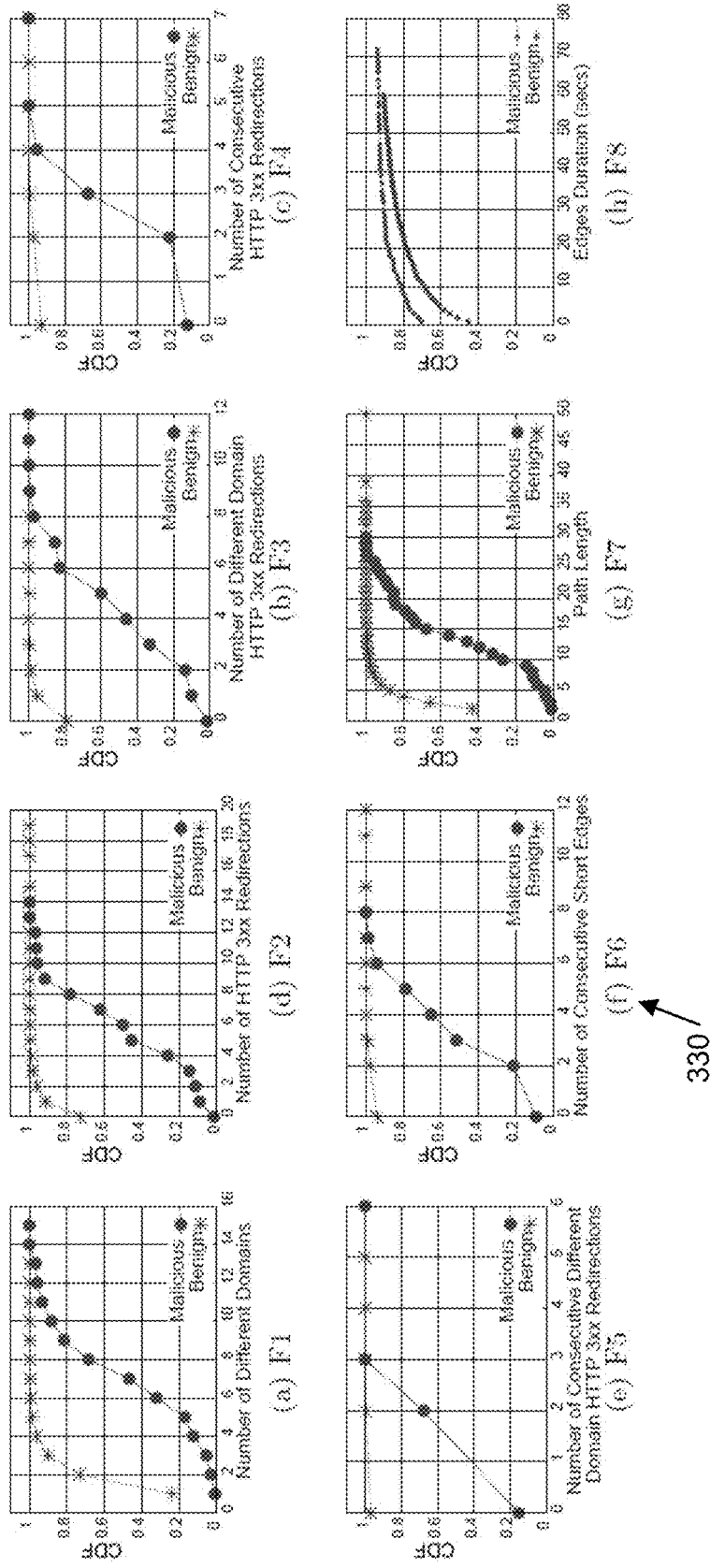
FIG. 3.3

DETECTING MALICIOUS HTTP REDIRECTIONS USING USER BROWSING ACTIVITY TREES

BACKGROUND OF THE INVENTION

In the Internet, browsers send HTTP requests to web servers via GET or POST methods, and render the HTTP response content returned from the server. The HTTP response may contain embedded objects such as JavaScript files, CSS links, images, embedded frames, etc. These embedded objects may trigger additional HTTP requests, which are submitted by the browser until the complete webpage is rendered. Throughout this disclosure, HTTP request and HTTP response may be referred to simply as request and response, respectively, unless explicitly stated otherwise. These rendering practices provide opportunities for malicious attackers to inject their malicious script as part of popular websites. As a result, the malicious script is fetched by the browser as part of the response content, and the malicious script starts redirecting the user to other servers/hosts controlled by the attacker. This is done, on one hand, to hide the main server hosting the malicious script or binary, and on the other hand, to use cloaking techniques to decide which clients to attack based on client characteristics. As a result, the malicious status of infected hosts is often hidden and the HTTP flows containing malicious redirections are not immediately detectable.

Existing techniques for detecting these attacks typically rely on actively crawling the Internet to search for potential malware distribution sites. Unfortunately, such strategies are susceptible to cloaking or anti-emulation mechanisms employed by attackers. One key common characteristics of these types of attacks are that they rely on HTTP redirections, where users' requests are automatically re-directed through a series of intermediate websites (e.g., intermediate node (107)), before landing on the final malware distribution site (e.g., 109). Frequently, the attackers will employ a number of different domain names and web servers to obfuscate the malicious websites. The automatic HTTP redirections may be performed either via HTTP 3xx redirections issued by the intermediate web servers, or dynamically executed scripts embedded in the webpage content. The goal of the multiple HTTP redirections in a sequence is to make it more difficult for security analysts to detect the malicious servers.

SUMMARY

In general, in one aspect, the present invention relates to a method for detecting malicious HTTP redirections in a network. The method includes obtaining, from the network and based on a single client IP address, one or more HTTP flows triggered by visiting a website, wherein the one or more HTTP flows comprises a first sequence of HTTP request/response pairs, extracting, from the first sequence and using a first pre-determined algorithm, a second sequence of universal resource locators (URLs) comprising an upstream URL and a downstream URL adjacent to each other in the second sequence, wherein the downstream URL is extracted from a child HTTP request that is triggered by a parent HTTP request comprising the upstream URL, analyzing, by a processor of a computer system using a second pre-determined algorithm, the second sequence to generate a statistical feature comprising at least one selected from a group consisting of a first tally of different domains, a second tally of HTTP redirections, a third tally of different domain HTTP redirections, a fourth tally of consecutive HTTP redirections, a fifth tally of consecutive different domain HTTP redirections, a sixth tally of consecutive short inter-URL durations, a length of the second sequence, and a statistical parameter of inter-URL duration distribution, and classifying, based on the statistical feature, the first sequence as comprising at least one malicious HTTP redirection triggered by visiting the website.

In general, in one aspect, the present invention relates to a system for detecting malicious HTTP redirections in a network. The system includes a computer processor, a flow parser configured to obtain, from the network and based on a single client IP address, one or more HTTP flows triggered by visiting a website, wherein the one or more HTTP flows comprises a first sequence of HTTP request/response pairs, an universal resource locator (URL) sequence extractor executing on the computer processor and configured to extract, from the first sequence and using a first pre-determined algorithm, a second sequence of URLs comprising an upstream URL and a downstream URL adjacent to each other in the second sequence, wherein the downstream URL is extracted from a child HTTP request that is triggered by a parent HTTP request comprising the upstream URL, a feature extractor executing on the computer processor and configured to analyze, using a second pre-determined algorithm, the second sequence to generate a statistical feature comprising at least one selected from a group consisting of a first tally of different domains, a second tally of HTTP redirections, a third tally of different domain HTTP redirections, a fourth tally of consecutive HTTP redirections, a fifth tally of consecutive different domain HTTP redirections, a sixth tally of consecutive short inter-URL durations, a length of the second sequence, and a statistical parameter of inter-URL duration distribution, a classifier executing on the computer processor and configured to classify, based on the statistical feature, the first sequence as comprising at least one malicious HTTP redirection triggered by visiting the website, and a repository configured to store the first sequence of HTTP request/response pairs and the second sequence of URLs.

In general, in one aspect, the present invention relates to a non-transitory computer readable medium embodying instructions for detecting malicious HTTP redirections in a network. The instructions when executed by a processor comprising functionality for obtaining, from the network and based on a single client IP address, one or more HTTP flows triggered by visiting a website, wherein the one or more HTTP flows comprises a first sequence of HTTP request/response pairs, extracting, from the first sequence and using a first pre-determined algorithm, a second sequence of universal resource locators (URLs) comprising an upstream URL and a downstream URL adjacent to each other in the second sequence, wherein the downstream URL is extracted from a child HTTP request that is triggered by a parent HTTP request comprising the upstream URL, analyzing, using a second pre-determined algorithm, the second sequence to generate a statistical feature comprising at least one selected from a group consisting of a first tally of different domains, a second tally of HTTP redirections, a third tally of different domain HTTP redirections, a fourth tally of consecutive HTTP redirections, a fifth tally of consecutive different domain HTTP redirections, a sixth tally of consecutive short inter-URL durations, a length of the second sequence, and a statistical parameter of inter-URL duration distribution, and classifying, based on the statistical feature, the first sequence as comprising at least one malicious HTTP redirection triggered by visiting the website.

Other aspects and advantages of the invention will be apparent from the following description and the appended claims.

BRIEF DESCRIPTION OF DRAWINGS

FIGS. 3.1-3.3 show various examples according to aspects of the invention.

DETAILED DESCRIPTION

Figure 1:
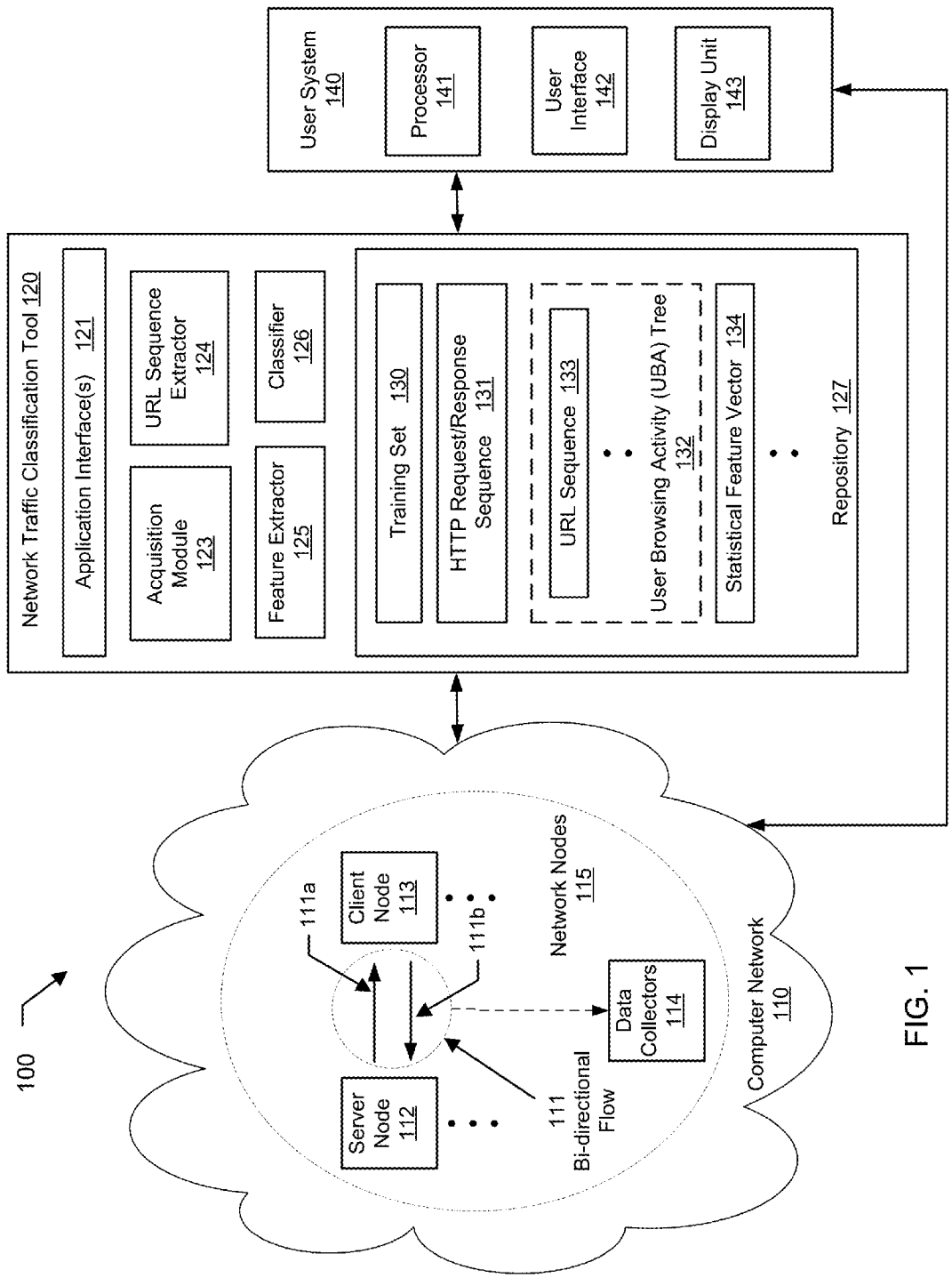
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

Embodiments of the invention provide a method, system, and computer readable medium to identify malicious HTTP redirection attacks by passively analyzing the network traffic. Specifically, embodiments of the invention provide a supervised machine learning-based methodology for detecting malicious websites by examining features associated with HTTP redirections. During a training phase, a per-user browsing activity tree (referred to as the training tree) is constructed from training HTTP flows as a representation of all interrelated hosts visited by a client (e.g., on a user's computer) in a relatively short period of time. A node in the tree is the requested Uniform Resource Locator (URL) and there are edges between parent and children nodes if the request for the URL of a child node is triggered from the URL of the parent node (e.g., via an HTTP 302 message, a JavaScript method or an HTML tag). Individual paths (i.e., sequences of URLs between the root and a leaf of the tree) in the training tree are classified as benign or malicious based on the ground truth. Key features are extracted from each path to capture inherent characteristics of malicious cases. Supervised machine learning is then used to select a set of features for setting up a classifier that effectively identifies and separates malicious paths from benign ones in the training tree. During a detection phase, network traffic is monitored to build a per-user tree of browsing activity of the real life HTTP flows under inspection. Individual paths in the tree are analyzed to extract same types of feature as those identified during the training phase as effective to separate malicious paths from benign ones in the training tree. These individual paths are then classified using the classifier based on their extracted features.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a network traffic classification tool (120), a user system (140), and a computer network (110). The network traffic classification tool (120) includes data repository (127), one or more application interfaces (121), acquisition module (123), URL extractor (124), feature extractor (125), and classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (115), such as server node (112), client node (113), data collectors (114), etc., which are devices configured with computing and communication capabilities for executing applications in the network (110).

As shown in FIG. 1, the server node (112) and client node (113) communicate with each other by exchanging data packets forming bi-directional flows, such as the bi-directional flow (111), which includes two uni-directional flows (111a) and (111b) represented by two arrows. In one or more embodiments, the server node (112) and the client node (113) exchange data packets in the bi-directional flow (111) as a result of an application executing on the server node (112) and the client node (113). In this context, the bi-directional flow (111) is referred to as being generated by the application executing on the server node (112) and client node (113). For example, the source IP address in the 5-tuple of the uni-directional flow (111a) and the destination IP address in the 5-tuple of the unit-direction flow (111b) are both the IP address of the server node (112), referred to as the server IP address. The destination IP address in the 5-tuple of the uni-directional flow (111a) and the source IP address in the 5-tuple of the unit-direction flow (111b) are both the IP address of the client node (113), referred to as the client IP address. The source port in the 5-tuple of the uni-directional flow (111a) and the destination port in the 5-tuple of the unit-direction flow (111b) are both the port of the server node (112), referred to as the server port. The destination port in the 5-tuple of the uni-directional flow (111a) and the port in the 5-tuple of the unit-direction flow (111b) are both the port of the client node (113), referred to as the client port. Further, the server port and the transport protocol in both 5-tuples are characteristics of the application executing on the server node (112) and the client node (113).

As noted above, a portion of the network nodes (115) may be infected by attackers to involve in malicious HTTP redirection attacks. An example of malicious HTTP redirection attacks is depicted in FIG. 3.1. Specifically, FIG. 3.1 illustrates a typical drive-by-download redirection sequence that hides the distribution server from investigation. In this example, initially via HTTP request (102), the user (101) reaches a landing page (103), which contains a malicious script that is returned via HTTP response (104). The client (105) is then inadvertently redirected to a series of other intermediate nodes (107) via HTTP request/response sequence (108), possibly under control of the attacker (not shown), until it finally reaches the distribution site (109), from which the malware is downloaded. The redirections involved in these chains could be HTTP redirections using 3xx response codes, JavaScript redirections using methods such as document.location, or HTML based methods such as using iframes, img, or meta tags. The intermediate nodes (107) are typically either compromised web servers or bot nodes controlled by the attacker. The client (105), landing page (103), intermediate nodes (107), and the distribution site (109) in this example are schematically represented as network nodes (115), such as server node (112), client node (113), etc. in FIG. 1. Further, the HTTP request (102), HTTP response (104), and HTTP request/response sequence (108) are schematically represented as bi-directional flows and/or uni-directional flows, such as the bi-directional flow (111) and the uni-directional flows (111a) and (111b) contained therein, etc. in FIG. 1.

Returning to the discussion of FIG. 1, in one or more embodiments, certain device(s) (e.g., data collectors (114)) within the computer network (110) may be configured to collect network data (e.g., bi-directional flow (111)) for providing to the network traffic classification tool (120). Each of these components is described below. One of ordinary skill in the art will appreciate that embodiments are not limited to the configuration shown in FIG. 1.

In one or more embodiments of the invention, the network traffic classification tool (120) is configured to interact with the computer network (110) using one or more of the application interface(s) (121). The application interface (121) may be configured to receive data (e.g., bi-directional flow (111)) from the computer network (110) and/or store received data to the data repository (127). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic classification tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic classification tool (120). The user may include, but is not limited to, an individual, a group, an organization, or some other entity having authority and/or responsibility to access the network traffic classification tool (120). Specifically, the context of the term "user" here is distinct from that of a user of the computer network (110). The user system (140) may be, or may contain a form of, an internet-based communication device that is capable of communicating with the application interface (121) of the network traffic classification tool (120). Alternatively, the network traffic classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic classification tool (120) (e.g., report, alert, etc.).

As shown, communication links are provided between the network traffic classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network traffic classification tool (120), the user system (140), and the communication links may be part of the computer network (110).

In one or more embodiments, a central processing unit (CPU, not shown) of the network traffic classification tool (120) is configured to execute instructions to operate the components of the network traffic classification tool (120). In one or more embodiments, the memory (not shown) of the network traffic classification tool (120) is configured to store software instructions for analyzing the network trace to construct traffic models, extract features, generating classification signatures/criteria, and classifying new flows captured from the network traffic, for example to identify the application(s) that generates the new flows. The memory may be one of a variety of memory devices, including but not limited to random access memory (RAM), read-only memory (ROM), cache memory, and flash memory. The memory may be further configured to serve as back-up storage for information stored in the data repository (127).

The network traffic classification tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic classification tool (120) is configured to obtain and store data in the data repository (127). In one or more embodiments, the data repository (127) is a persistent storage device (or set of devices) and is configured to receive data from the computer network (110) using the application interface (121). The data repository (127) is also configured to deliver working data to, and receive working data from, the acquisition module (123), URL extractor (124), feature extractor (125), and classifier (126). The data repository (127) may be a data store (e.g., a database, a file system, one or more data structures configured in a memory, some other medium for storing data, or any suitable combination thereof), which may include information related to the network traffic classification. The data repository (127) may be a device internal to the network traffic classification tool (120). Alternatively, the data repository (127) may be an external storage device operatively connected to the network traffic classification tool (120).

In one or more embodiments, the network traffic classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network traffic classification tool (120) is configured to support various data formats provided by the user system (140).

In one or more embodiments, the network traffic classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as training set (130), etc.

In one or more embodiments, a flow parser (e.g., acquisition module (123) in conjunction with data collectors (114)) reconstructs (e.g., eliminates redundant packets, collates packets into a correct sequence, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments of detecting malicious HTTP redirections using UBA trees, the flow parser (e.g., acquisition module (123) in conjunction with data collectors (114)) is configured to obtain, from the computer network (110) and based on a single client IP address, one or more HTTP flows triggered by visiting a website. Specifically, visited webpage(s) are rendered based on the one or more HTTP flows. For example, the one or more HTTP flows may involve only a single server and/or a single domain. In another example, the one or more HTTP flows may involve multiple servers and/or multiple domains. In particular, the one or more HTTP flows includes a sequence of HTTP request/response pairs (e.g., HTTP request/response sequence (131)) ordered according to their timestamps. This sequence may be associated with a single HTTP flow or multiple HTTP flows and represents all interrelated hosts visited by a client (i.e., identified by the single client IP address) in a relatively short period of time.

In one or more embodiments, the network traffic classification tool (120) includes the URL sequence extractor (124) that is configured to extract, from the HTTP request/response sequence (131) and using a user browsing activity (UBA) analysis algorithm, the URL sequence (133). In particular, the URL sequence (133) represents a series of URLs traversed by the client as a result of an initial visit to a website by the user. Throughout this disclosure, the term "HTTP request" may refer to the URL embedded in the HTTP request (i.e., the URL requested by the HTTP request) and vice versa. In other words, the HTTP request and the embedded URL may be used synonymously in this context where the URL sequence (133) corresponds to a series of HTTP requests.

In one or more embodiments, the URL sequence (133) is part of a larger data structure referred to as the UBA tree (132). In such embodiments, the UBA analysis algorithm may construct the UBA tree (132) from the HTTP request/response sequence (131) first before in turn extracting the URL sequence (133) from the UBA tree (132). In this context, the URL sequence extractor (131) may also be referred to as a UBA tree extractor. In one or more embodiments, the URL sequence (133) is extracted by the UBA analysis algorithm from the HTTP request/response sequence (131) directly. During constructing the URL sequence (133), a downstream URL is extracted from a child HTTP request that is triggered by a parent HTTP request requesting the upstream URL. In other words, the request for the downstream URL is triggered by the response for the upstream URL. In addition, the URLs are labeled by the form in which they were found in the response for the upstream URL, such as JavaScript embedded URL, iframe URL, HTTP Location header URL, etc.

As noted above, in one or more embodiments, extracting the URL sequence (133) includes the steps of extracting individual URLs from the HTTP request/response sequence (131), constructing the UBA tree (132) based at least on these individual URLs, and extracting each path of the UBA tree (132) as the the URL sequence (133). Details of an example are described below.

In one or more embodiments, individual URLs are first extracted from HTTP requests in the HTTP request/response sequence (131) and sent to an component of the URL sequence extractor (124), referred to as the Activity Tree Updater. In one or more embodiments, based on these extracted URLs, the Activity Tree Updater creates and updates several hash-tables and the UBA (132). Generally, a UBA tree includes nodes and edges to represent all HTTP requests and URLs container therein that are triggered by a user visiting a website. In one or more embodiments, a node in the UBA tree represents an HTTP request (referred to as a request in the node). In addition, an edge in the UBA tree indicates that the request in the child node was initiated through the request in the parent node. The edge is labeled with information describing how the parent node request triggered the child node request, such as triggered by user clicking a hyperlink, by a request generated by an iframe tag, or by a JavaScript AJAX request.

To construct the UBA tree, the HTTP flows associated with a single client IP address are grouped into one or more sessions. Specifically, there is a unique (server IP address, client IP address) pair for all flows in the session. In one or more embodiments, a client session ends after a pre-determined time period without any message exchanged with the server. More specifically, a session is a sequence of client HTTP requests in which the elapse time (also referred to as the silence period) between two consecutive requests is less than the pre-determined time period. For example, thirty-seconds may be chosen as an example silence period because it is a reasonable threshold to separate different activities for a single user and can capture cases in which attackers deliberately delay the download of the malware by several seconds (e.g., up to 15 seconds in a malware known as moshchuk2006crawler) using JavaScript timer functions. In this example, a session is a sequence of client HTTP requests in which the elapsed time between two consecutive requests is less than thirty seconds. HTTP records (i.e., requests and responses) within a session may be ordered by timestamp to facilitate the analysis to construct the UBA tree. For each HTTP request/response pair, the HTTP headers and all the URLs embedded in the HTTP response payload are analyzed. The URL embedded in the response causes the client to redirect from the URL in the request. Accordingly, the URL in the response is categorized and assigned a label (referred to as URL type) that identifies how the HTTP request (parent node) in the request/response pair triggered the next HTTP request (child node) based on the response in the request/response pair. When constructing the UBA tree using the UBA analysis algorithm, the URL type is used by the Activity Tree Updater to label the edges in the UBA tree for describing how the parent node request triggered the child node request, such as triggered by user clicking a hyperlink, by a request generated by an iframe tag, or by a JavaScript AJAX request.

TABLE 1 summarizes example URL types that may be implemented in the UBA analysis algorithm. Note that this list is not comprehensive, and it represents the heuristics employed by the UBA analysis algorithm to reconstruct the user browsing activity. Additional heuristics may be added to increase the accuracy of the UBA analysis algorithm, with a trade-off in complexity. For example, semi-dynamic JavaScript analysis based on the unescape command may be performed in the UBA analysis algorithm to identify encoded JavaScript commands that can potentially contain hidden URLs, which may then be categorized as an additional URL type.

TABLE 1

| URL Type | Example |
| --- | --- |
| HTTP 3xx redirection | Location: www.domain.com |
| HTML meta tag redirection | <meta http-equiv = 'refresh' url = 'http://www.domain.com/'> |
| HTTP Referrer header | Referrer: www. domain.com |
| JavaScript redirection (static analysis) | document.location, location.href, etc |
| Other | <a>, <iframe>, <link>, <img>, etc |

During the analysis of the sequence of HTTP records (i.e., requests and responses ordered according to timestamps), after parsing the current HTTP request payload and extracting the URL embedded therein, the URL (referred to as current requested URL) is looked up to see if it appears in a previous (i.e., upstream in the sequence) payload in the sequence. If the current requested URL is found in any previous HTTP response payload, then it (synonymously, the corresponding HTTP request) is added as a child node to an existing node (now a parent node to this newly added child node) in the UBA tree that triggered the previous HTTP response. In addition, the edge between these two nodes is labeled with the URL type of the current requested URL. For instance, if a previous response to the HTTP request for url1 contains a JavaScript code that has a document.location redirection to url2 (i.e., url2 is found in this previous response payload), then, url2 is stored with an indication that it is a JavaScript redirection (e.g., as the URL type of url2) from url1. Then, after encountering a subsequent HTTP request (i.e., the current HTTP request) to url2, the stored information is used to add url2 (synonymously, the current HTTP request) as a child node to url1 (synonymously, the previous HTTP request) in the UBA tree Note that if there is no redirection triggered by url1, there will not be a visit to url2. This applies to all URL types in TABLE 1. In case that the current URL is not found in any previous HTTP payload upstream in the sequence, but the referrer field from its HTTP header (i.e., the header of the current HTTP request) matches a previous URL, then the current URL (synonymously, the current HTTP request) is attached as a child node to the previous URL (synonymously, the previous HTTP request) node. If all lookups fail to find the current URL in any upstream HTTP records (i.e., requests and responses), then the current URL is an isolated node in the UBA tree as with no parent or child. Accordingly, a new tree is created with the current URL as the root. The sequence of nodes from a root node to a leaf node is referred to as a path of the UBA tree. In the context of HTTP request and requested URL being synonymous, each path of the UBA tree (e.g., UBA tree (132) depicted in FIG. 1) corresponds to a sequence of URL (e.g., URL sequence (133) depicted in FIG. 1).

FIG. 3.2 illustrates an example UBA tree (320) constructed by the UBA analysis algorithm described above. The UBA tree (320) is an example of the UBA tree (132) depicted in FIG. 1. Specifically, the UBA tree (320) is constructed from a HTTP session (e.g., containing HTTP request/response sequence (131) depicted in FIG. 1) triggered by a user visiting the homepage of the website www.websiteA.com, which is embedded in a client HTTP request in the root node (321) of the UBA tree (320). Throughout this disclosure, the terms "website" and "URL" are used interchangeably. Further, any text string in the format of an URL is used to represent only the text string itself, without referring to any content hosted on any Internet website. As shown in FIG. 3.2, each node of the UBA tree (320) is annotated therein by the hostname part of the URL of the HTTP request in the node. In addition, each edge of the UBA tree (320) is annotated by (a) the URL type (e.g., HTTP302, JavaScript, <img>) assigned to the URL of the HTTP request in the child node and (b) the time that elapsed between the HTTP requests in the parent node and child node. For example, the request for URL: www.websiteB.com in the node (322) was generated 1 second after the request URL: www.websiteA.com in the node (321). As shown in FIG. 3.2, the UBA tree (320) includes multiple paths (i.e., URL sequences, such as the URL sequence (133) depicted in FIG. 1). The highlighted path having the node (323) (URL: 999.9.99.99) (note: sample IP addresses are provided for example purposes only and do not correspond to real world IP addresses) as leaf node can be identified as a malicious path based on a ground truth that the node (324) (URL: 555.5.55.55) was previously flagged by an IDS (Intrusion Detection Service) as causing a fake-antivirus attack. The other paths, which have leave nodes (325) (URL: websiteD.com) and leaf nodes (326) (URL: img.websiteE.com), are identified by the IDS as benign requests for images. Further analysis reveals that the website www.websiteA.com (visited as a result of HTTP request in node (321)) is registered with a traffic aggregator website www.websiteB.com (visited as a result of HTTP request in node (322)). This traffic aggregator website www.websiteB.com redirected, during the analyzed session and using the HTTP request in node (328), the user to a traffic buyer website websiteC.com, which in turn caused a redirection to the website websiteD.com using the HTTP request in node (329). The website websiteD.com had an injected JavaScript file to be hosted on the website 555.5.55.55 (visited as a result of the HTTP request in nodes (324)), which is eventually flagged by the IDS.

Returning to the discussion of FIG. 1, as noted above, HTTP records (e.g., HTTP request/response sequence (131)) within a session are ordered by timestamps. In one or more embodiments, the UBA analysis algorithm employed by the URL sequence extractor (124) is configured to scan the HTTP request/response sequence (131) and perform two actions for each record (i.e., request or response) in the sequence. Specifically, the UBA analysis algorithm updates the UBA tree (132) and updating associated data-structures (not shown). Initially, both the UBA tree (132) and associated data-structures are empty. The URL in the first record of the HTTP request/response sequence (131) is added to the UBA tree (132) directly. In one or more embodiments, three hash-tables (i.e., the associated data-structures) are used in constructing the UBA tree (132), namely: (1) links table: hash table keys are links extracted from the HTTP response payload and hash table values are tuples containing the link type and the current HTTP request URL; (2) redirections table: hash table keys are HTTP Location header URLs and hash table values are HTTP request URLs if that header exists in the current record; (3) referrers table: hash table keys are HTTP request URLs since any request URL can exist in the HTTP Referrer header for future requests. Updating the UBA tree (132) involves three hash-table lookups in the following order:

(I) Redirections table lookup for the current URL. If the URL is found, this means that a previous page initiated an HTTP 3xx or JavaScript redirection to the current page. Thus, the current URL (referencing the current page) is added as a child node in the UBA tree (132) and the edge is labeled as HTTP 3xx or JavaScript, and the entry is deleted from the hash-table.

(II) Links table lookup for the current URL. If the URL is found then the current URL was embedded in a previous page. Thus, the current URL (referencing the current page) is added as a child node in the UBA tree (132) and the edge is labeled using the URL type entry in the hash-table. This entry is not removed from the hash-table since users can revisit a URL multiple times.

(III) Referrers table lookup for the HTTP Referrer header URL if this header exists. If the header exists and the lookup was successful. Then, the current URL is added as a child node in the UBA tree (132) with the new edge assigned the URL type "Referrer header URL". This entry is not removed from the hash-table since many pages can include the same URL in the Referrer header.

After analysis for the HTTP request/response sequence (131) is completed, these hash-tables are flushed to start a new session for the user. In one or more embodiments, the UBA analysis algorithm processes the HTTP flow as it is received, and be used to analyze live-traffic since it does not wait until the session ends to start processing the HTTP flows.

In one or more embodiments, the network traffic classification tool (120) includes the feature extractor (125) that is configured to analyze, using a feature extracting algorithm, the URL sequence (133) to generate a statistical feature. The statistical feature may include (i) a tally of different domains, (ii) a tally of HTTP redirections, (iii) a tally of different domain HTTP redirections, (iv) a tally of consecutive HTTP redirections, (v) a tally of consecutive different domain HTTP redirections, (vi) a tally of consecutive short inter-URL durations, (vii) a number of nodes in the URL sequence, (viii) a statistical parameter of inter-URL duration distribution, (iv) Duration of the URL sequence, etc., or combinations thereof. In one or more embodiments, the statistical feature of the URL sequence (132) is stored in the repository (127) as a vector, such as the statistical feature vector (134), which may have any number of vector elements corresponding to one or more of the features described above. These features are described in detail below.

(i) Number of Different Domains (F1). This feature counts the number of different domains in the path (e.g., URL sequence (132)) of the UBA tree (132). Two domains are considered to be different if the top two level domains are different, taking into consideration country codes and other well known top level domains (TLDs). For example, x.a.com is considered the same domain as y.a.com. In typical benign content distribution network (CDN) or advertisement network scenarios, the number of different domains involved is relatively small. In contrast in malicious cases, the number of domains involved in a single path is relatively large.

(ii) Number of Redirections (F2). In one or more embodiments, this feature counts the total number of edges in the path which are labeled as HTTP 3xx redirections. Multiple redirections in a single path is considered indication of suspicious malicious activity. In one or more embodiments, these HTTP redirections are separated by other edges such as JavaScript redirections.

(iii) Number of Different Redirections (F3). In one or more embodiments, this feature counts the number of different domain redirections caused by HTTP 3xx headers. In other words, if the edge is labeled as HTTP 3xx redirection and both the parent node and the child node are considered different domains, the F3 count is incremented based on this edge.

(iv) Number of Consecutive Redirections (F4). In one or more embodiments, this feature counts the number of consecutive edges in the paths which are labeled as HTTP 3xx redirections. The maximum number of consecutive HTTP 3xx redirections found in the path is used as F4. The larger this value, the more suspicious.

(v) Number of Consecutive Different Domain Redirections (F5). In one or more embodiments, this feature counts the number of consecutive edges labeled as HTTP 3xx redirections where redirections are between different domains. A larger value of F5 indicates the path as more suspicious.

(vi) Number of Consecutive Short Edges (F6). In one or more embodiments, edges with elapse time less than a pre-determined threshold is considered as a short edge. For example, a one second threshold provides high confidence that the redirection is not a user generated action. This feature is used to capture any type of redirection (e.g., 3xx messages, JavaScripts, etc) that occurs in a very short period of time. The larger this number, the more suspicious the path tends to be.

(vii) Path Length (F7). In one or more embodiments, this feature counts the number of nodes in the path, leveraging the observation that malicious paths are typically long.

(viii) Edge Duration (F8). In one or more embodiments, this feature captures the statistical distribution of the edge durations in a path. For example, one or more of the median, average, min, and max edge durations may be included as distinct values in the feature vector.

In one or more embodiments, the network traffic classification tool (120) includes the classifier (126) that is configured to classify, based on the statistical feature (e.g., statistical feature vector (134)) of the URL sequence (133), the URL sequence (133), and therefore the HTTP request/response sequence (131) as well, as including at least one malicious HTTP redirection triggered by visiting the website. In one or more embodiments, the classifier (126) employs a J48 decision tree model known to those skilled in the art. Specifically, the J48 decision tree model is built using the features (e.g., statistical feature vector (134)) extracted from multiple training paths in a training UBA tree that is extracted from HTTP flows in the training set (130). These training paths are assigned labels of malicious or benign classes based on ground truth. In one or more embodiments, parameters of the classifier (126) (e.g., parameters in the J48 decision tree model are adjusted during a training phase using a supervised machine learning algorithm. Details of configuring the classifier (126) by adjusting these parameters are described below.

In one or more embodiments, during the training phase, the flow parser (e.g., acquisition module (123) in conjunction with data collectors (114)) is further configured to obtain a training HTTP flow set (i.e., the training set (130)) corresponding to training visits to websites, i.e., visiting websites under controlled testing environment. The URL sequence extractor (124) is further configured to extract, from the training HTTP flow set (i.e., the training set (130)) and using at least the aforementioned UBA analysis algorithm, multiple URL sequences, referred to as training sequences of URLs. Based on ground truth, a portion of these training sequences of URLs are identified as malicious URL sequences and another portion these training sequences of URLs are identified as benign URL sequences. The feature extractor (125) is further configured to analyze, using the aforementioned feature extracting algorithm, these separate portions to generate a malicious set of statistical features associated with the malicious sequences and a benign set of statistical features associated with the benign sequences. The classifier (126) is configured by a supervised machine learning module that is configured to determine, using a supervised machine learning algorithm known to those skilled in the art, at least one parameter of the classifier (126) based on the malicious set of statistical features and the benign set of statistical features. Accordingly, URL sequence is classified by using the classifier (126) in response to the determining.

FIG. 3.3 shows eight cumulative distribution (CDF) function plots obtained from an example training set for the aforementioned statistical features F1 through F8. Each plot has two curves, the solid-dotted curve shows the CDF of the feature values for the malicious URL sequences and the intermittent-starred curve shows the CDF for the benign URL sequences. For instance, the F6 CDF plot (330) shows the CDF distribution for the number of consecutive short edges (i.e., any edge with elapse time less than 1 sec) in both malicious and benign URL sequences. The x-axis represents the number of short edges and the y-axis represents the CDF value. The F6 CDF plot (330) shows that only 8% of the malicious URL sequences have 0 consecutive short edges, while 96% of the benign URL sequences have 0 consecutive short edges. As shown in FIG. 3.3, for the features F1 through F8, the malicious and benign behaviors are clearly distinct towards x=0. In other words, the y-intercepts between the malicious and benign CDF curves are clearly separable. However, the malicious and benign CDF curves merge toward larger x-values, indicating that false positive cases may exist. However, once multiple features are combined in the decision tree classifier (e.g., classifier (126) of FIG. 1), the false positive rate becomes negligible.

Figure 2:
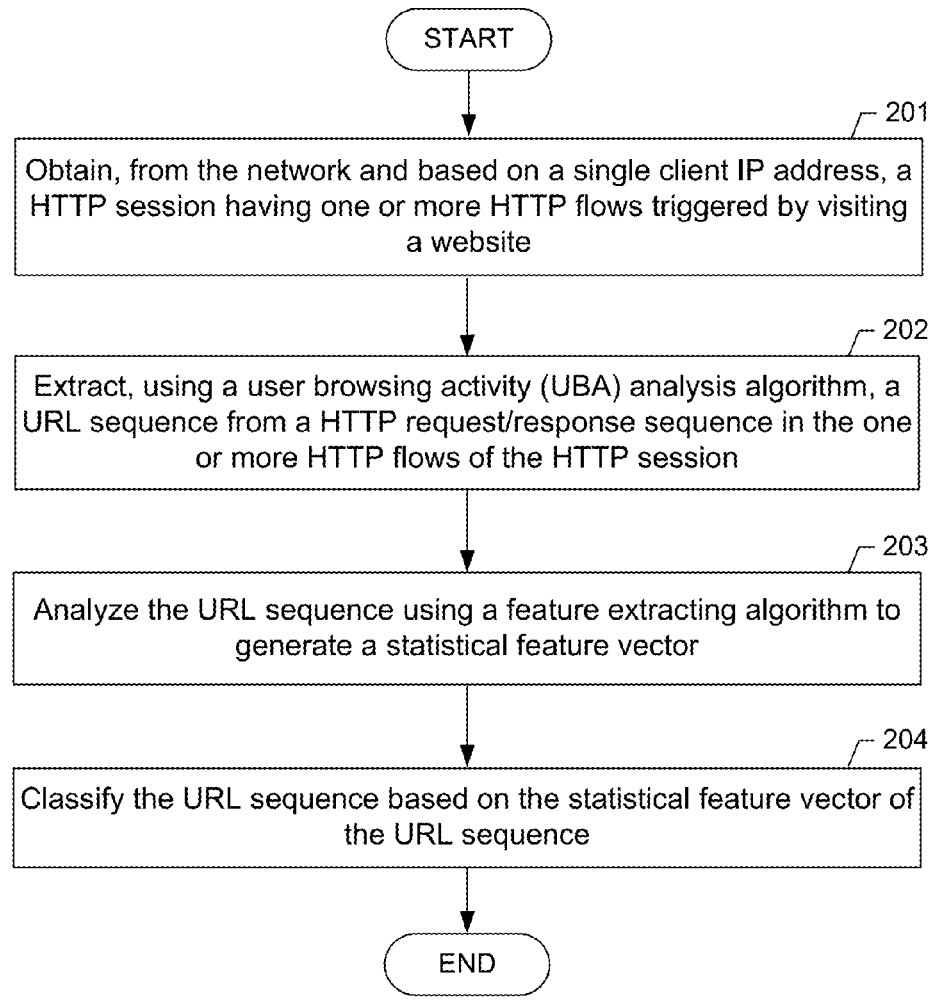
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 201, a network trace is obtained from the computer network. In one or more embodiments, the flows are captured and parsed throughout a pre-configured time interval recurring on a periodic basis (e.g., every minute, hourly, daily, etc.) or triggered in response to an event.

In one or more embodiments, a portion of the network trace is selected based on a single client IP address. The portion may include one or more HTTP flows triggered by visiting a website from the single client IP address. Specifically, visited webpage(s) are rendered based on the one or more HTTP flows. For example, the one or more HTTP flows may involve only a single server and/or a single domain. In another example, the one or more HTTP flows may involve multiple servers and/or multiple domains. In particular, the one or more HTTP flows includes a sequence of HTTP request/response pairs ordered according to their timestamps. This sequence, referred to as a HTTP request/response sequence, may be associated with a single HTTP flow or multiple HTTP flows and represents all interrelated hosts visited by a client (i.e., identified by the single client IP address) in a relatively short period of time.

In Step 202, a URL sequence is extracted from the HTTP request/response sequence using a user browsing activity (UBA) analysis algorithm. In one or more embodiments, the URL sequence represents a series of URLs traversed by the client as a result of an initial visit to a web site by the user. As noted above, the term "HTTP request" may refer to the URL embedded in the HTTP request (i.e., the URL requested by the HTTP request) and vice versa. In other words, the HTTP request and the embedded URL may be used synonymously in this context where the URL sequence (133) corresponds to a series of HTTP requests.

In one or more embodiments, the URL sequence is extracted by the UBA analysis algorithm from the HTTP request/response sequence directly. In one or more embodiments, the URL sequence is part of a larger data structure referred to as the UBA tree. In such embodiments, the UBA analysis algorithm may construct the UBA tree from the HTTP request/response sequence first before in turn extracting the URL sequence from the UBA tree. During constructing the URL sequence, a downstream URL is extracted from a child HTTP request that is triggered by a parent HTTP request requesting the upstream URL. In other words, the request for the downstream URL is triggered by the request for the upstream URL.

In one or more embodiments, Step 202 may be performed using the URL sequence extractor (124) described in reference to FIG. 1 above.

In Step 203, the URL sequence analyzed using a feature extracting algorithm to generate a statistical feature. In one or more embodiments, the statistical feature may include (i) a tally of different domains, (ii) a tally of HTTP redirections, (iii) a tally of different domain HTTP redirections, (iv) a tally of consecutive HTTP redirections, (v) a tally of consecutive different domain HTTP redirections, (vi) a tally of consecutive short inter-URL durations, (vii) a number of nodes in the URL sequence, (viii) a statistical parameter of inter-URL duration distribution, (iv) Duration of the URL sequence, etc., or combinations thereof. In one or more embodiments, the statistical feature of the URL sequence is stored as a vector, referred to as a statistical feature vector, which may have any number of vector elements corresponding to one or more of the features described above. These features are described in detail below.

In one or more embodiments, Step 203 may be performed using the feature extractor (125) described in reference to FIG. 1 above.

In Step 204, the URL sequence is classified based on the statistical feature vector of the URL sequence as either a malicious sequence containing at least one malicious HTTP redirections, or a benign sequence without any suspicious HTTP redirection. Accordingly, the HTTP request/response sequence, from which the URL sequence is extracted, is classified. In one or more embodiments, an endpoint that is not initially identified as malicious based on the pre-identified endpoint threat level is detected as malicious using the method described above. In one or more embodiments, an alert is generated indicating that malicious HTTP redirections are detected. For example, the alert may be presented to a network security specialist of an ISP. In one or more embodiments, a security operation is initiated with respect to the detected malicious HTTP redirections. For example, the security operation may seek to isolate, deactivate, or otherwise neutralize any future malicious attack of the same pattern.

In one or more embodiments, Step 204 may be performed using the classifier (126) described in reference to FIG. 1 above, such as a J48 decision tree model based classifier.

In one or more embodiments, prior to classifying URL sequences as described above, the classifier is created and configured using the aforementioned supervised machine learning module based on a training set with pre-identified malicious and benign URL training sequences according to ground truth.

Figure 4:
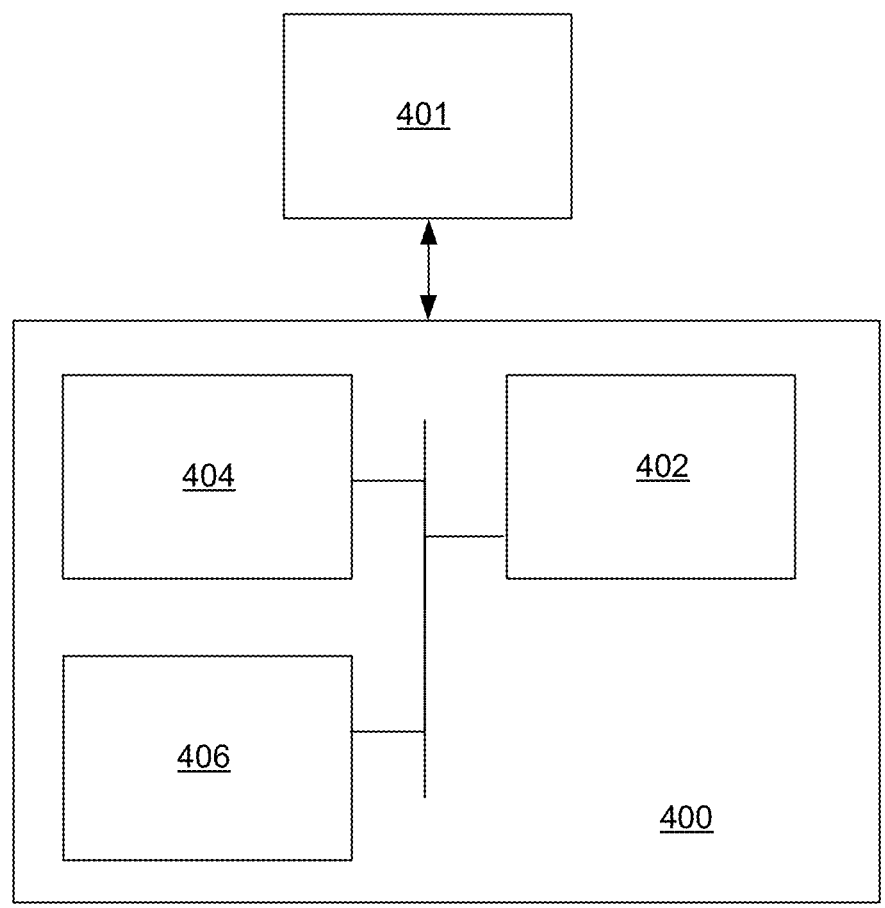
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting malicious HTTP redirections in a network, comprising:
    obtaining, from the network and based on a single client IP address, one or more HTTP flows triggered by a client device visiting a website, wherein the one or more HTTP flows comprises a first sequence of HTTP request/response pairs, the first sequence of HTTP request/response pairs including a first sequence of universal resource locators (URLs);
    constructing a per-user tree using the one more HTTP flows, the per-user tree including nodes corresponding to URLs, including the first sequence of URLs, wherein the per-user tree includes an edge from a parent node to a child node if a request for a URL corresponding to the child node is triggered from the URL corresponding to the parent node, wherein each edge of the per-user tree is annotated by: 1) a URL type assigned to the URL corresponding to the child node and 2) a time that elapses between HTTP requests in the parent node and child node, wherein the per-user tree includes multiple paths, the multiple paths corresponding to both benign requests and malicious paths;
    extracting, from the first sequence and using a first pre-determined algorithm, a second sequence of URLs comprising an upstream URL and a downstream URL adjacent to each other in the second sequence, wherein the downstream URL is extracted from a child HTTP request that is subsequent to a parent HTTP request comprising the upstream URL, wherein extracting the second sequence of URLs comprises:
        selecting, from the first sequence, the parent HTTP request and the child HTTP request that are generated by the client device;
        selecting, from the first sequence, a parent HTTP response received by the client device, wherein the parent HTTP response is generated by a server device identified by the upstream URL;
        detecting that the parent HTTP response comprises the downstream URL, wherein the child HTTP request is generated by the client device based on the parent HTTP response; and
        including, in response to the detecting, the upstream URL and the downstream URL in the second sequence of URLs;
    updating the per-user tree to include paths corresponding to the extracted second sequence of URLs;
    analyzing, by a processor of a computer system using a second pre-determined algorithm, the second sequence of URLs to generate a statistical feature of URLs based at least on the upstream URL and the downstream URL, the statistical feature being stored in a statistical feature vector; and
    classifying, based on the statistical feature of URLs, the first sequence of HTTP request/response pairs as comprising at least one malicious HTTP redirection triggered by visiting the website, wherein classifying includes updating the per-user tree to reflect that the path on the per-user tree corresponding to the at least one malicious HTTP redirection is malicious.

2. The method of claim 1, further comprising:
    obtaining a training HTTP flow set corresponding to training visits to websites;
    extracting, from the training HTTP flow set and using at least the first pre-determined algorithm, a plurality of training sequences of URLs;
    selecting, from the plurality of training sequences of URLs, a first portion identified as malicious sequences and a second portion identified as benign sequences;
    analyzing, using the second pre-determined algorithm, the first portion and the second portion to generate a first plurality of statistical features associated with the malicious sequences and a second plurality of statistical features associated with the benign sequences, respectively; and
    determining, using a supervised machine learning algorithm, at least one parameter of a classifier based on the first plurality of statistical features and the second plurality of statistical features,
    wherein the first sequence is classified by using the classifier to analyze the statistical feature of the second sequence.

3. The method of claim 1,
    wherein any consecutive HTTP flows, if present in the one or more HTTP flows, are separated by less than a pre-determined silence period, and
    wherein all of the one or more HTTP flows are separated from any other HTTP flow having the single client address by at least the pre-determined silence period.

4. The method of claim 1, wherein the classifying comprises:
    determining that the second sequence is malicious based on the statistical feature;
    identifying, in response to the determining, the at least one malicious HTTP redirection based on the second sequence.

5. The method of claim 1, further comprising:
generating, in response to at least the classifying, an alert of a malicious HTTP redirection attack.

6. The method of claim 5, further comprising:
analyzing the first sequence and the second sequence to identify the at least one malicious HTTP redirection, and
including, in the alert, information regarding the malicious HTTP redirection.

7. A system for detecting malicious HTTP redirections in a network, comprising:
 a computer processor;
 a flow parser configured to obtain, from the network and based on a single client IP address, one or more HTTP flows triggered by a client device visiting a website, wherein the one or more HTTP flows comprises a first sequence of HTTP request/response pairs, the first sequence of HTTP request/response pairs including a first sequence of universal resource locators (URLs);
 a per-user tree constructor executing on the computer processor and configured to construct a per-user tree using the one more HTTP flows, the per-user tree including nodes corresponding to URLs, including the first sequence of URLs, wherein the per-user tree includes an edge from a parent node to a child node if a request for a URL corresponding to the child node is triggered from the URL corresponding to the parent node, the per-user tree constructor also configured to update the per-user tree based upon extracted sequences of URLs, wherein each edge of the per-user tree is annotated by: 1) a URL type assigned to the URL corresponding to the child node and 2) a time that elapses between HTTP requests in the parent node and child node, wherein the per-user tree includes multiple paths, the multiple paths corresponding to both benign requests and malicious paths;
 an universal resource locator (URL) sequence extractor executing on the computer processor and configured to extract, from the first sequence and using a first pre-determined algorithm, a second sequence of URLs comprising an upstream URL and a downstream URL adjacent to each other in the second sequence, wherein the downstream URL is extracted from a child HTTP request that is subsequent to a parent HTTP request comprising the upstream URL, wherein extracting the second sequence of URLs comprises:
  selecting, from the first sequence, the parent HTTP request and the child HTTP request that are generated by the client device;
  selecting, from the first sequence, a parent HTTP response received by the client device, wherein the parent HTTP response is generated by a server device identified by the upstream URL;
  detecting that the parent HTTP response comprises the downstream URL, wherein the child HTTP request is generated by the client device based on the parent HTTP response; and
  including, in response to the detecting, the upstream URL and the downstream URL in the second sequence of URLs;
 a feature extractor executing on the computer processor and configured to analyze, using a second pre-determined algorithm, the second sequence of URLs to generate a statistical feature of URLs based at least on the upstream URL and the downstream URL, the statistical feature being stored in a statistical feature vector;
 a classifier executing on the computer processor and configured to classify, based on the statistical feature of URLs, the first sequence of HTTP request/response pairs as comprising at least one malicious HTTP redirection triggered by visiting the website, wherein classifying includes updating the per-user tree to reflect that the path on the per-user tree corresponding to the at least one malicious HTTP redirection is malicious; and
 a repository configured to store the first sequence of HTTP request/response pairs, the statistical feature vector, and the second sequence of URLs.

8. The system of claim 7,
 wherein the flow parser is further configured to obtain a training HTTP flow set corresponding to training visits to websites;
wherein the URL sequence extractor is further configured to extract, from the training HTTP flow set and using at least the first pre-determined algorithm, a plurality of training sequences of URLs;
 wherein the plurality of training sequences of URLs comprises a first portion identified as malicious sequences and a second portion identified as benign sequences; wherein the feature extractor is further configured to analyze, using the second pre-determined algorithm, the first portion and the second portion to generate a first plurality of statistical features associated with the malicious sequences and a second plurality of statistical features associated with the benign sequences, respectively;
 wherein the system further comprises a supervised machine learning module executing on the computer processor and configured to determine, using a supervised machine learning algorithm, at least one parameter of the classifier based on the first plurality of statistical features and the second plurality of statistical features, and wherein the first sequence is classified by using the classifier in response to the determining.

9. The system of claim 7,
 wherein any consecutive HTTP flows, if present in the one or more HTTP flows, are separated by less than a pre-determined silence period, and
 wherein all of the one or more HTTP flows are separated from any other HTTP flow having the single client address by at least the pre-determined silence period.

10. The system of claim 7, wherein the classifying comprises:
 determining that the second sequence is malicious based on the statistical feature;
 identifying, in response to the determining, the at least one malicious HTTP redirection based on the second sequence.

11. The system of claim 7, the classifier further configured to:
 generate, in response to at least the classifying, an alert of a malicious HTTP redirection attack.

12. The system of claim 11, the classifier further configured to:
 analyze the first sequence and the second sequence to identify the at least one malicious HTTP redirection, and
include, in the alert, information regarding the malicious HTTP redirection.

13. A non-transitory computer readable medium embodying instructions for detecting malicious HTTP redirections in a network, the instructions when executed by a processor comprising functionality for:

obtaining, from the network and based on a single client IP address, one or more HTTP flows triggered by a client device visiting a website, wherein the one or more HTTP flows comprises a first sequence of HTTP request/response pairs, the first sequence of HTTP request/response pairs including a first sequence of universal resource locators (URLs);

constructing a per-user tree using the one more HTTP flows, the per-user tree including nodes corresponding to URLs, including the first sequence of URLs, wherein the per-user tree includes an edge from a parent node to a child node if a request for a URL corresponding to the child node is triggered from the URL corresponding to the parent node, wherein each edge of the per-user tree is annotated by: 1) a URL type assigned to the URL corresponding to the child node and 2) a time that elapses between HTTP requests in the parent node and child node, wherein the per-user tree includes multiple paths, the multiple paths corresponding to both benign requests and malicious paths;

extracting, from the first sequence and using a first pre-determined algorithm, a second sequence of URLs comprising an upstream URL and a downstream URL adjacent to each other in the second sequence, wherein the downstream URL is extracted from a child HTTP request that is subsequent to a parent HTTP request comprising the upstream URL, wherein extracting the second sequence of URLs comprises:

selecting, from the first sequence, the parent HTTP request and the child HTTP request that are generated by the client device;

selecting, from the first sequence, a parent HTTP response received by the client device, wherein the parent HTTP response is generated by a server device identified by the upstream URL;

detecting that the parent HTTP response comprises the downstream URL, wherein the child HTTP request is generated by the client device based on the parent HTTP response; and including, in response to the detecting, the upstream URL and the downstream URL in the second sequence of URLs;

updating the per-user tree to include paths corresponding to the extracted second sequence of URLs;

analyzing, using a second pre-determined algorithm, the second sequence to generate a statistical feature of URLs based at least on the upstream URL and the downstream URL, the statistical feature being stored in a statistical feature vector; and classifying, based on the statistical feature of URLs, the first sequence of HTTP request/response pairs as comprising at least one malicious HTTP redirection triggered by visiting the website, wherein classifying includes updating the per-user tree to reflect that the path on the per-user tree corresponding to the at least one malicious HTTP redirection is malicious.

14. The non-transitory computer readable medium of claim 13, the instructions when executed by the processor further comprising functionality for:

obtaining a training HTTP flow set corresponding to training visits to websites;

extracting, from the training HTTP flow set and using at least the first pre-determined algorithm, a plurality of training sequences of URLs;

selecting, from the plurality of training sequences of URLs, a first portion identified as malicious sequences and a second portion identified as benign sequences;

analyzing, using the second pre-determined algorithm, the first portion and the second portion to generate a first plurality of statistical features associated with the malicious sequences and a second plurality of statistical features associated with the benign sequences, respectively; and determining, using a supervised machine learning algorithm, at least one parameter of a classifier based on the first plurality of statistical features and the second plurality of statistical features, wherein the first sequence is classified by using the classifier to analyze the statistical feature of the second sequence.

15. The non-transitory computer readable medium of claim 13, wherein any consecutive HTTP flows, if present in the one or more HTTP flows, are separated by less than a pre-determined silence period, and wherein all of the one or more HTTP flows are separated from any other HTTP flow having the single client address by at least the pre-determined silence period.

16. The non-transitory computer readable medium of claim 13, wherein the classifying comprises:

determining that the second sequence is malicious based on the statistical feature;

identifying, in response to the determining, the at least one malicious HTTP redirection based on the second sequence.

17. The non-transitory computer readable medium of claim 13, the instructions when executed by the processor further comprising functionality for:

generating, in response to at least the classifying, an alert of a malicious HTTP redirection attack.

18. The non-transitory computer readable medium of claim 17, the instructions when executed by the processor further comprising functionality for:

analyzing the first sequence and the second sequence to identify the at least one malicious HTTP redirection, and including, in the alert, information regarding the malicious HTTP redirection.

19. The method of claim 1, wherein the statistical feature of URLs comprises at least one selected from a group consisting of a first tally of different domains in the second sequence of URLs, a second tally of HTTP redirections in the second sequence of URLs, a third tally of different domain HTTP redirections in the second sequence of URLs, a fourth tally of consecutive HTTP redirections in the second sequence of URLs, a fifth tally of consecutive different domain HTTP redirections in the second sequence of URLs, a sixth tally of consecutive short inter-URL durations in the second sequence of URLs, a length of the second sequence of URLs, and a statistical parameter of inter-URL duration distribution of the second sequence of URLs.

20. The system of claim 7, wherein the statistical feature of URLs comprises at least one selected from a group consisting of a first tally of different domains in the second sequence of URLs, a second tally of HTTP redirections in the second sequence of URLs, a third tally of different domain HTTP redirections in the second sequence of URLs, a fourth tally of consecutive HTTP redirections in the second sequence of URLs, a fifth tally of consecutive different domain HTTP redirections in the second sequence of URLs, a sixth tally of consecutive short inter-URL durations in the second sequence of URLs, a length of the second sequence of URLs, and a statistical parameter of inter-URL duration distribution of the second sequence of URLs.

* * * * *